Jan. 11, 1938.  C. E. LINDEN ET AL  2,105,288

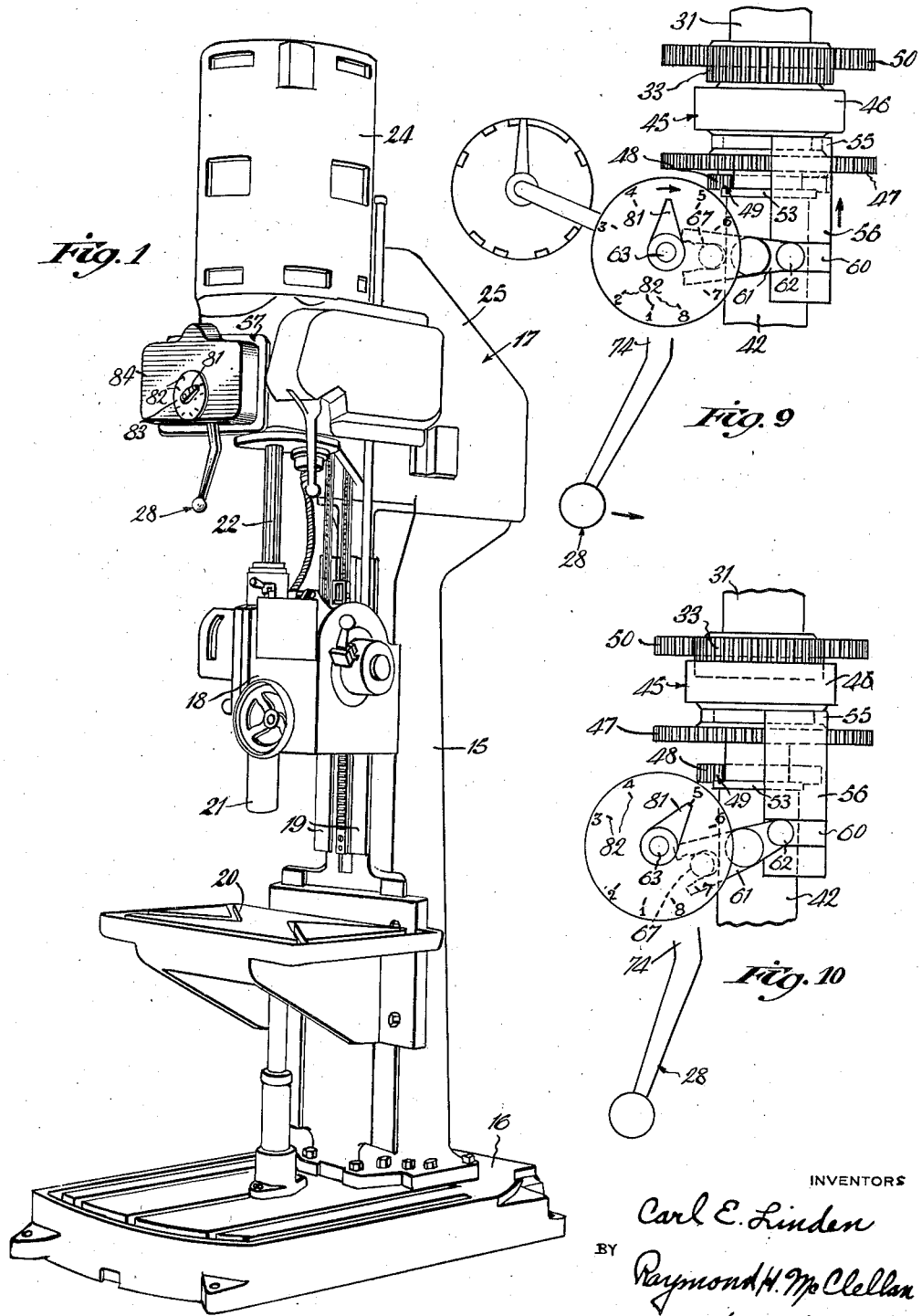

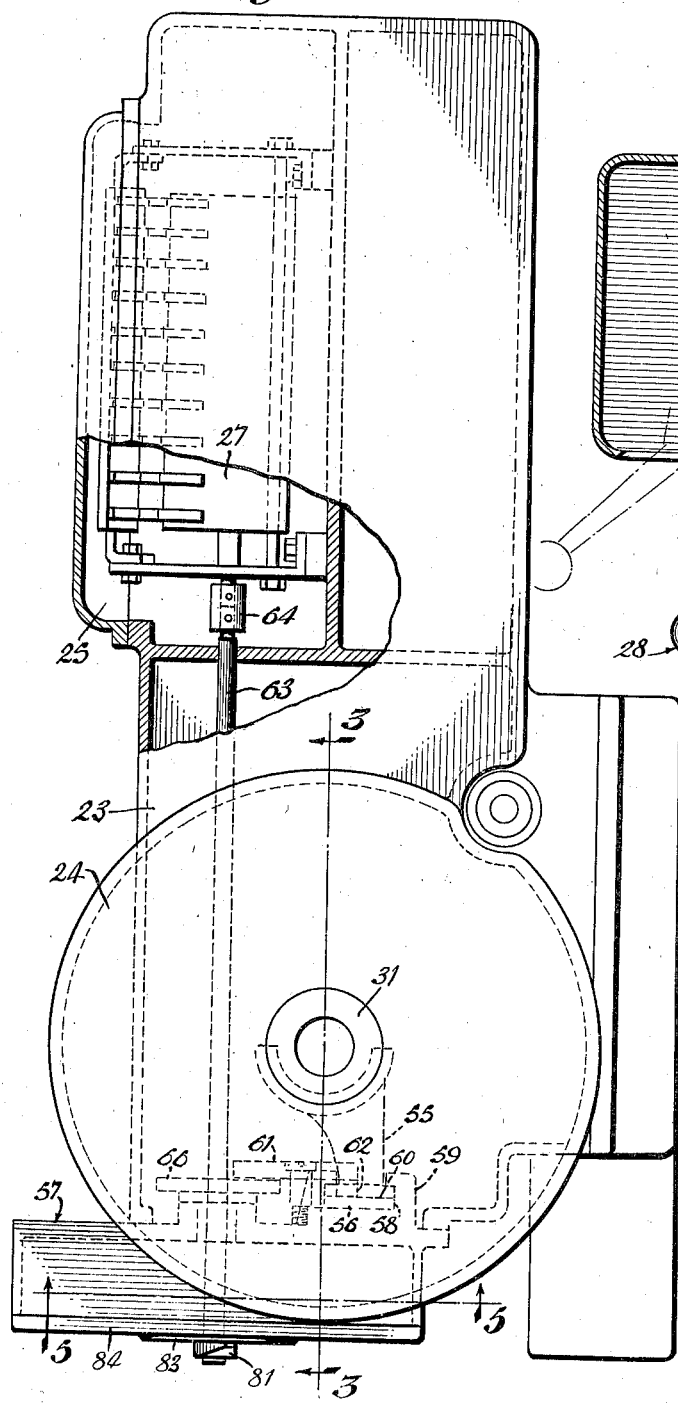

SPINDLE DRIVING TRANSMISSION

Filed May 22, 1935   5 Sheets-Sheet 3

INVENTORS
Carl E. Linden
Raymond H. McClellan
BY
Wood & Wood ATTORNEYS

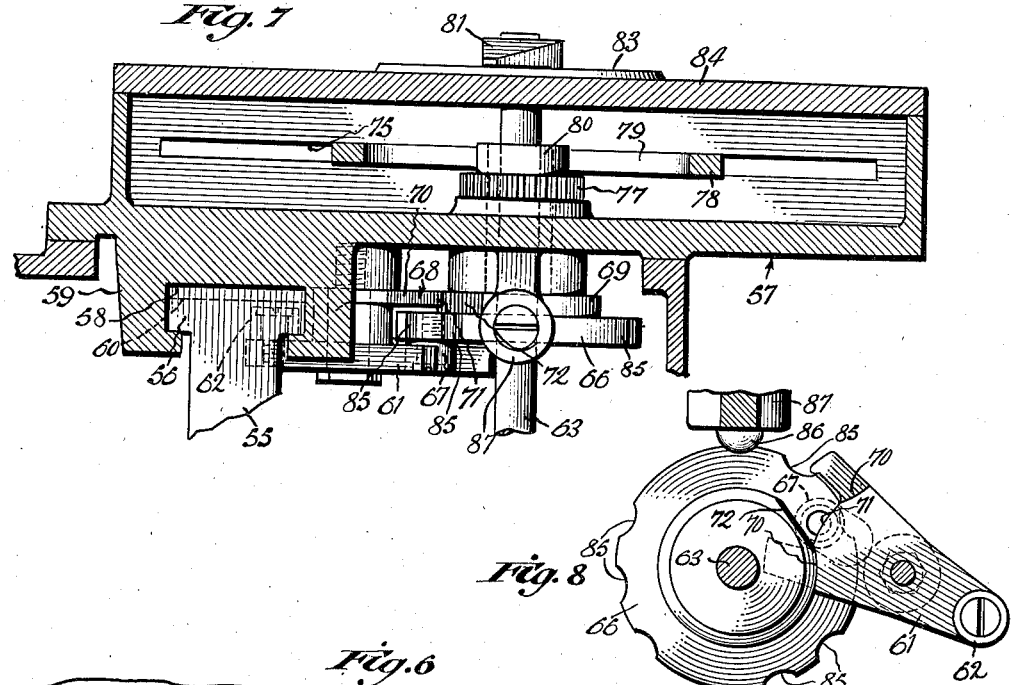
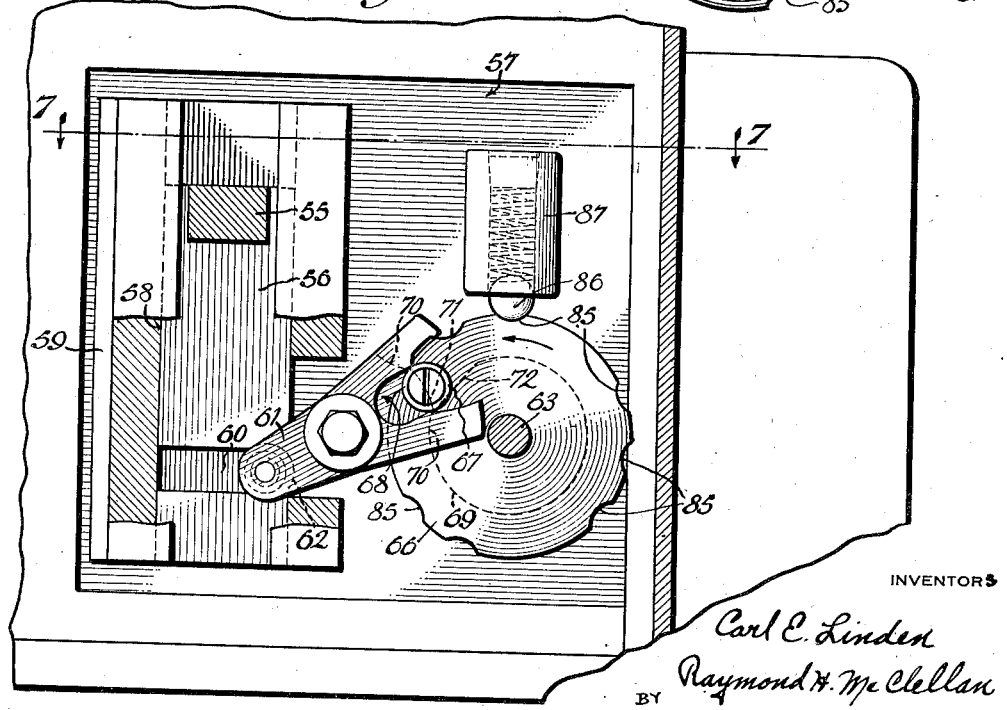

Jan. 11, 1938.                C. E. LINDEN ET AL                    2,105,288
                          SPINDLE DRIVING TRANSMISSION
                              Filed May 22, 1935                5 Sheets-Sheet 5

INVENTORS
Carl E. Linden
BY Raymond H. McClellan
Wood + Wood ATTORNEYS

Patented Jan. 11, 1938

2,105,288

UNITED STATES PATENT OFFICE 2,105,288

SPINDLE DRIVING TRANSMISSION

Carl E. Linden, Norwood, and Raymond H. McClellan, Hamilton, Ohio, assignors to The Fosdick Machine Tool Company, Cincinnati, Ohio, a corporation of Ohio Application May 22, 1935, Serial No. 22,794

5 Claims. (Cl. 74—477)

This invention relates to improvements in speed control devices, and is particularly directed to a motor driven gear transmission for use in driving drill spindles or the like.

It is the object of this invention to provide an electric motor driven transmission by means of which a wide range of speeds can be provided; in which the speeds imparted to the driven part through motor speed control and gear shifts may be automatically controlled by means of a single lever, the usual range of speeds of the motor being automatically multiplied through the common lever; and in which the shifting of gears in conjunction with the operation of the speed control means for the electric motor is accomplished without clashing of the gears by control apparatus slowing down the motor as the gear shifts are made.

With these objectives in mind, the present embodiment of the invention may include a multiple or variable speed controller for the motor, a gear transmission between the motor and the part being driven, and a single lever controlling the motor speed controller and the gear shift, whereby the speeds obtained in the driven part are in sequence as to rate, and are controlled from one lever. The improved construction can be applied so as to multiply the electric motor speeds any number of times through appropriate gear shifts interconnected or operated mechanically with the operation of the motor controller for raising or lowering the speeds of the motor upon each gear shift always delivering the motor speed in the same sequence as to rate. In other words, the motor selected may be capable of operation, for example, at four different speeds, which speeds are delivered to the driven part through a transmission which may step the motor speed range up or down as the case may be, but which will always deliver the ranges of motor speed so that the ultimate speeds at the driven part are constantly increased or decreased in rate.

Other objects and further advantages will be more fully apparent from a description of the accompanying drawings, in which:

Figure 1 is a perspective view of a drill incorporating the present improvements.

Figure 2 is an enlarged top plan view of the drill, a portion thereof being broken away for the purpose of showing the connection of the control shaft to the motor controller switch shaft.

Figure 5 is a sectional view taken on line 5—5, Fig. 2, detailing the control lever operating connection to the switch and gear shifting shaft.

Figure 6 is a sectional view taken on line 6—6, Fig. 3, illustrating the details of the back gear shifting mechanism and the positioning detents for the controller.

Figure 7 is a sectional view taken on line 7—7, Fig. 6, further detailing the shifting mechanism.

Figure 8 is a sectional view taken on line 8—8, Fig. 4, showing the details of the back gear support element.

Figure 9 is a diagrammatic view illustrating the relation of the back gear shifting device and the controller switch for the motor showing the dial and lever in appropriate position and the back gear shift occurring.

Figure 10 is a view similar to Figure 9, but showing direct drive connection.

Figure 4:
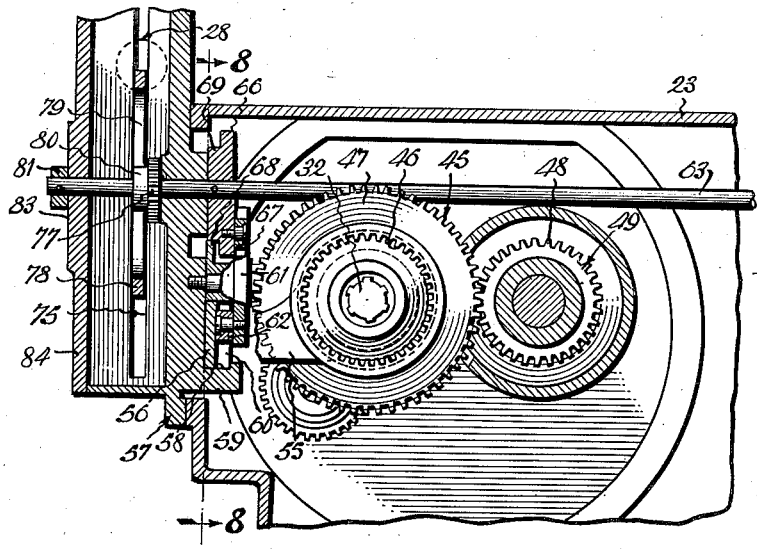
Figure 4 is a sectional view taken on line 4—4, Fig. 3, further detailing the transmission and the back gear shifting device.

For the purpose of illustration, the improvements concerned in this application have been applied to a drill of the following construction. A column 15 is mounted on a base 16 and carries a power transmission head 17 at its upper end and a drill head unit 18 slidably supported on the forward side of the column on vertical ways 19. A work supporting table 20 is suitably mounted on the column and the base directly beneath the head 18. Suitable means are provided for adjustably supporting the head and for feeding the same vertically on the column.

The tool spindle 21, vertically downwardly disposed from the head, is driven by means of a shaft 22 extended upwardly from the spindle and the head and having splined connection with the transmission in the head at the top of the column. All of the present improvements relate to the motor driven transmission for the spindle driving shaft 22 and accordingly the detailed description will be confined to the structure at the top of the column.

Figure 3:
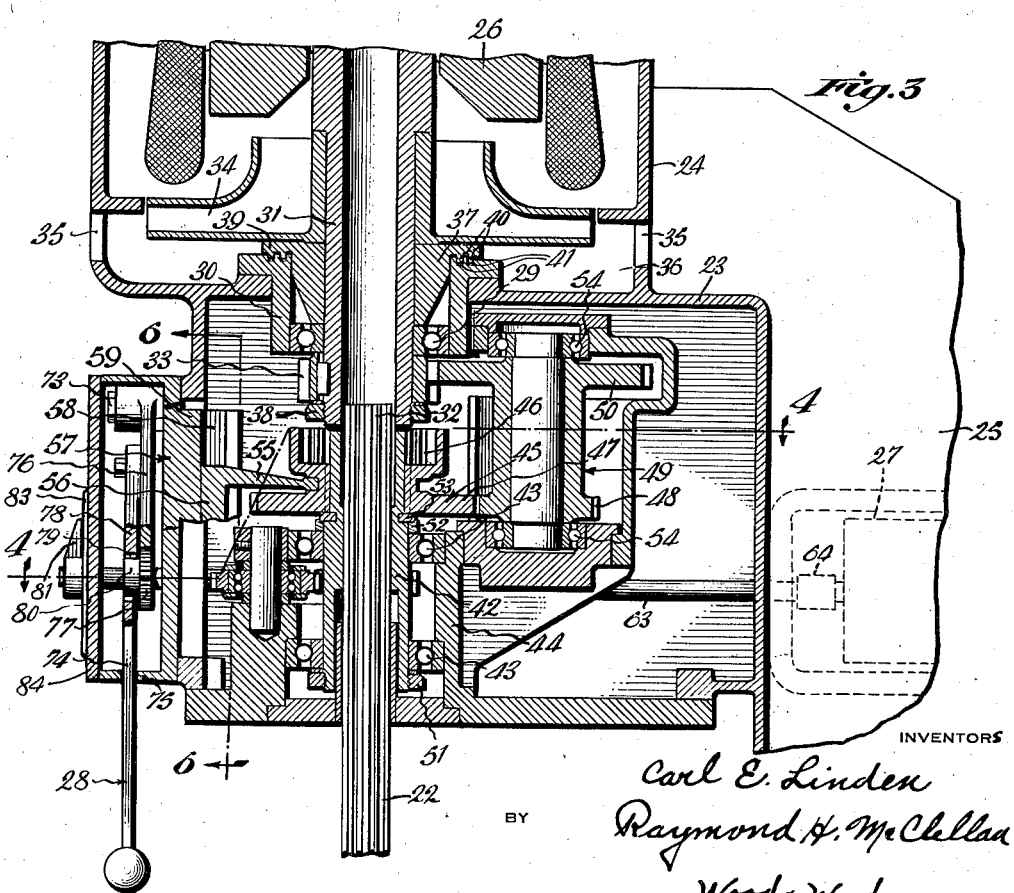
Figure 3 is a sectional view taken on line 3—3, Fig. 2, detailing the drive transmission from the motor to the spindle shaft.

The transmission head casing structure incorporates three chambers, namely, a transmission casing or chamber 23, a motor chamber casing 24, and a controller switch chamber 25. As shown, in Figures 2 and 3, the motor chamber 24 is extended upwardly from the transmission chamber 23 and the controller switch chamber 25 is extended rearwardly from the transmission chamber.

In general, the structures embodied in these three casings is as follows: A motor 26 in the chamber 24 drives the shaft 22 either directly or through back gearing. The motor speed is controlled by means of a switch 27 having duplicate sets of contacts in this embodiment. The speeds of the motor as controlled by the switch may be of any number and in this instance happen to be four. The range of delivered speeds is doubled by the use of the back gearing. A single lever 28 operates the controller switch and the back gearing shiftable gears for the purpose of setting up twice the number of motor speeds, namely, eight in the present instance. One complete swing of the lever moves the control mechanism through eight delivered speeds. In doing so it rotates the controller switch once, operating the back gear for shifting from direct drive to back gearing drive between the sets of contacts of the switch. It is also provided by arrangement on the controller switch that prior to or at the time of meshing or shifting from back drive to direct drive, the motor speed is lowered so as to lessen clashing of the gears.

Specifically describing the structure heretofore generally outlined, the motor is vertically disposed in its casing and has its lower end (see Figure 3) journalled in a ball bearing 29 mounted in a bearing support element 30 of the transmission casing. The motor shaft 31 is hollow for the purpose of telescopical engagement loosely over the splined upper end 32 of the tool drive spindle shaft 22. The lower end of the motor shaft carries a driving gear 33 keyed thereto within the transmission casing.

A fan element 34 is keyed to the lower end of the motor shaft within the motor housing, this fan element forcing air from the motor housing by centrifugal force through radial tubular arms rotating in the plane of apertures 35 in the motor housing 36.

The assembly of the gear and fan, and the mounting of the lower end of the shaft on the transmission housing is accomplished in the following manner. A sealing sleeve 37 is fixed on the motor shaft between the fan element and the ball bearing. A nut 38 on the screw-threaded lower end of the motor shaft, when drawn up, engages the gear 33 tightly against the inner race of the ball bearing from beneath and the fan 34 and sealing sleeve 37 against the upper side of the inner race of the ball bearing from above, thus clamping all elements to the inner race of the ball bearing.

The sealing sleeve includes a circular flange 39 having depending concentric circular lugs 40 engaged in annular grooves 41 in the horizontal top surface of the bearing support sleeve.

As will be later described, but omitted from the mechanical details, the motor is wired to the controller switch for the appropriate speed control by connections to the two windings, for example, of the shell type induction motor used herein.

The vertically disposed spindle driving shaft 22 has its splined upper end in splined driving connection with a sleeve 42, loosely rotatively supported on spaced ball bearings 43, 43, fixed in a circular inner lug 44 of the transmission casing. This sleeve has a shiftable compound gear element 45 in splined connection with its upper end.

The compound gear incorporates an upper internal gear 46, adapted to mesh with the driving gear 33, and a lower spur gear 47 adapted to engage a gear 48 of a second compound gear or back gear element 49 suitably journalled in the transmission casing. The other gear 50 of the back gear element 49 is in constant mesh with the upper portion of the driving gear 33 so that the compound back gear element is being driven constantly while the motor is running.

The sleeve 42 is held in position against vertical displacement on its bearings by means of a nut 51 screwed on the lower end thereof against the inner race of the lower bearing 43. This nut draws abutment washers 52, 53, the first of which lies on the upper surface of the inner race of the upper bearing and is engaged by the second, namely 53, disposed in an annular groove 54 in the sleeve tightly against the top surface of the inner race of the upper bearing 43. The upper washer 53 or the one fixed in the sleeve serves as a support or stop for the shiftable compound gear 45, limiting its downward movement to perfect mesh with the back gear. Therefore it will be understood that this shiftable compound gear, as shown in the present embodiment, has two positions, namely, upper or direct drive position, or lower or back gear drive position. The number of positions of course can be increased as desired. The back gear 49 is journalled in ball bearings 54, 54, suitably mounted in the transmission housing.

The shiftable compound gear is operated by means of a yoke arm 55, as a part of a slide 56 vertically slidably mounted in a casing and closure element 57 of the transmission housing. The element 57 includes a slideway 58 in its inner side for this purpose. This slideway is formed in a lug 59 projecting into the housing. The slideway includes overhanging flanges and may be described as a T-slot as viewed in top plan view.

The slide 56 carrying the yoke has a cross groove 60 in its lower end. A lever 61 pivoted on the closure element 57 has one end carrying a roller 62 engaged in said cross slot or groove 60, and its other end bifurcated to provide an operating connection as follows:

A shaft 63 is mounted horizontally through the transmission casing and has its extreme inner end coupled to the controller switch shaft by a coupling sleeve 64 (see Figure 2). Its outer end is journalled in the closure element 57 passing through the casing portion thereof. This shaft is rotated by means of the lever 28 hereinafter described in detail. A back gear operating disc 66 is pinned to the shaft adjacent the inner side of the slide element, this disc carrying a roller 67 extended therefrom after the manner of a crank pin. This roller is adapted to engage in the slotted or bifurcated end of the lever 61 upon each rotation of the disc, somewhat after the manner of a Geneva gear. The bifurcation or slot in the end of the lever is widened for clearance purposes so that entrance and departure of the roller 67 will be facilitated.

A lock or gear support element 68 is incorporated (see Figure 8) for maintaining the shiftable gear 45 in either upper or lower position, particularly in upper position so that it will not fall under the action of gravity. This element extends from the hub of the lever and is adapted to engage the hub 69 of the disc. The outer end of the lock element or arm is of the following shape. Arcuate surfaces 70, 70, are extended from a flat intermediate portion 71 to the side edges of the arm, these arcuate portions being described on a radius very slightly greater than the radius of the hub of the disc for the purpose of working clearance. The hub has a portion 72 flattened immediately adjacent the operating roller thereof. As shown in Figure 6, when the slide operating the gear is at its lowest position, the lower of the arcuate portions is engaged with the surface of the disc hub.

As the roller moves into the slot of the lever, the flat portion of the hub of the disc moves adjacent to the arcuate portion just mentioned, thereby providing clearance and permitting rotation of the lock element and swinging movement of the lever under the influence of the roller in the slot thereof. The lever swings to move the shiftable gear to its upper position, and as this upper position is reached the flattened portion of the hub has passed the lock element and the curve of the hub then engages the upper arcuate portion of the lock element, whereby it is impossible for the shiftable gear to drop until the operator moves the disc to place the flattened portion opposite or adjacent to the arcuate portion such as occurs when reverse rotation of the disc is accomplished after a movement of the shift lever through the full range of speed.

The lever 28 which operates the back gear shifting disc and the switch is suspended from a pivot stud 73 within the casing portion of the slide element and at the upper end thereof. The manipulating knob or arm portion 74 of the lever depends downwardly through a slot 75 in the lower portion of the casing. The lever is made in two parts. The upper or pivoted part 76 is in the form of a segmental gear having its gear teeth engaging a spur gear 77 pinned on the shaft, and the other or lower part 78 is bolted against the forward face of the first element and includes an arcuate slot 79 having its curve generated on the axis of the pivot of the lever and of a width fitting the hub 80 of the spur gear. This slot is of a length sufficient to permit one full rotation of the disc and to limit movement of the lever to one full rotation.

Figure 11:
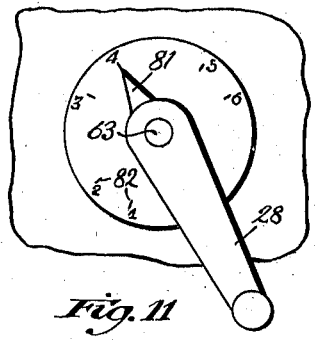
Figure 11 is a detailed view of a modified form of control lever, showing the same associated with the dial.
Figure 13:
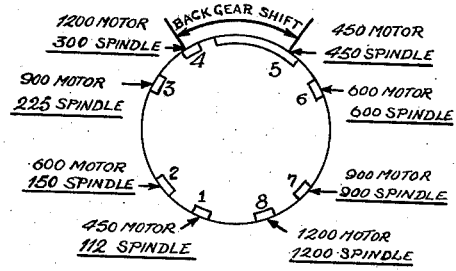
Figure 13 is a diagram showing the contacts of the switch and illustrating by legends the motor and spindle speeds and the range of the back gear shift.

The extreme outer end of the shaft carries an indicator finger 81 moving in relation to appropriate indicia 82 on the edges of a circular boss 83 on the forward face of the cover plate 84 of the casing. In the present arrangement provision is made for eight positions. This however can be modified to meet various demands. All of these positions are definitely located with ease by the operator, not only by noting the indicator finger but through the aid of detent grooves 85 in the disc engaged by a detent plunger ball 86 disposed in a lug 87 of the closure or casing element 57. The shift or control lever 28 may be on the outer end of the controller shaft 63 as shown in Figure 11 if desired.

The disengaged or intermediate position of the shiftable gear 45 finds the shift lever and shaft with the switch in position where the motor is being controlled for automatically slowing down the same so as to lessen slashing of gears as they are engaged. The connection between the gear shifting slide and the operating shaft is shown as a form of Geneva movement, but it will be observed that it can take other forms such as intermittent gearing. Also a multiple Geneva movement may be used or any other suitable device for accomplishing back gear shift more than once during a given revolution.

In other words, the present invention contemplates any number of mechanical gear changes in connection with a multi-speed electrical motor control with an electrical controller making a cycle of motor speed change for each gear shift, that is to say, running through all its speeds each time a gear is shifted.

The motor control switch used herein controls the motor for four speeds as shown in R. P. M. from 450 to 1200. With the same speed of the spindle repeating the cycle of speeds with the back gear in mesh, spindle speeds of from 112 R. P. M. up to 300 R. P. M. (see Figure 11) are obtained.

Figure 12:
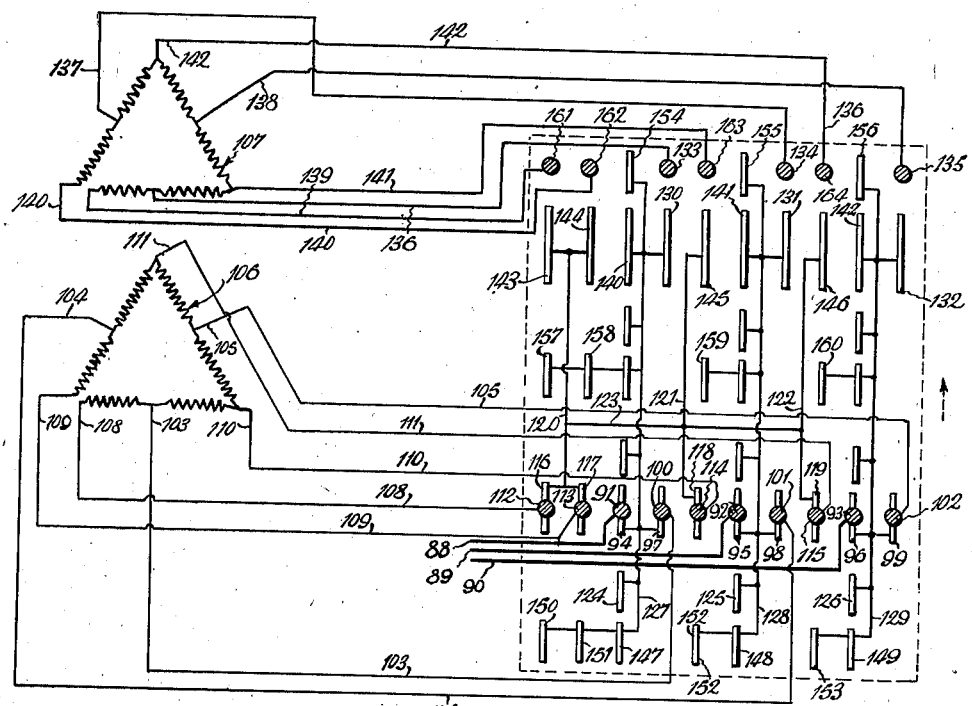
Figure 12 is a wiring diagram showing the motor windings, the switch contacts and the wiring therebetween.

Referring to Figure 12, the motor controller switch and motor are shown diagrammatically. Three power lines are provided, 88, 89 and 90, which power lines are connected to stationary contacts 91, 92 and 93, of the controller switch. The motor incorporates two windings. The switch provides duplicate sets of contacts for the purpose of duplicating a range of four speeds in one rotation of the controller representing eight speeds on the dial as shown with interposed gear change.

The motor speeds are 450, 600, 900 and 1200 R. P. M. respectively. The first set of motor speeds are lowered to 112, 150, 225 and 300 R. P. M. respectively at the spindle when the back gear is in, but when the back gear is shifted the spindle speeds are stepped up in direct drive to the same speeds as the motor so that the increase in speed is uniform, ranging from 130 at the spindle to 1200 at the spindle.

With the indicator set at 450 R. P. M., namely motor speed, 112 R. P. M. spindle speed, the connections are as follows: Contacts 91, 92 and 93 are in contact with rotating contacts 94, 95 and 96 of the rotating switch element. These contacts are in electrical connection with other contacts 97, 98 and 99 of the controller in longitudinal alignment therewith. These latter contacts are in engagement with stationary contacts 100, 101 and 102 of the switch, which contacts have motor leads 103, 104 and 105 extended therefrom to a winding 106 of the motor. These windings are delta connected. The last mentioned connections are tapped or partial delta to provide a low motor speed. All the connections of the other winding 107 are open, whereas leads 108, 109, 110 and 111 of the first mentioned winding 106 are connected through stationary contacts 112, 113, 114 and 115, moving contacts 116, 117, 118 and 119, connections 120, 121 and 122, and intermediate lead 123.

Moving the controller one step up to the second speed, the motor speed is increased to 600 R. P. M. and spindle speed to 150 R. P. M. At this position, as will be apparent, the moving contacts 124, 125 and 126 then engage the stationary power input contacts 91, 92 and 93. Leads 127, 128 and 129 of the switch connect these last mentioned contacts to moving contacts 130, 131 and 132, which contacts then engage stationary contacts 133, 134 and 135 of the switch. These last mentioned contacts are connected to the other winding 107 of the motor in tapped or partial delta connections by motor leads 136, 137 and 138 respectively, this winding being suitable for providing a faster speed. All the connections of the other winding are then open, whereas the other connections to winding 107, namely 139, 140, 141 and 142 are connected together through contacts 143, 144, 145 and 146, connections 120, 121 and 122 and interconnection 123.

Upon movement of the controller switch to the next position, namely 3, 900 motor R. P. M., 225 spindle R. P. M., the power input contacts 91, 92 and 93 then are engaged by movable contacts 147, 148 and 149. These contacts are connected to other movable contacts 150, 151, 152 and 153, which latter contacts engage stationary contacts 112, 113, 114 and 115, which contacts are as described extended to the delta connections of the winding 106 through the previously mentioned leads 108, 109, 110 and 111. At the same time leads 103, 104 and 105 are open. All the leads of the other winding are also open.

At the next position, namely 4, 1200 motor R. P. M., 300 spindle R. P. M., the stationary input contacts 91, 92 and 93, are then engaged by movable contacts 154, 155 and 156. These movable contacts are also connected to movable contacts 157, 158, 159 and 160 by the connections 127, 128 and 129. The last mentioned movable contacts engage stationary contacts 161, 162, 163 and 164 respectively, which stationary contacts extend to the delta connections of the winding 107 through leads 139, 140, 141 and 142.

It will be observed that leads 136, 137 and 138 of winding 107 are open as well as all the leads of winding 106. At this time the controller has been rotated 180° approximately. The other half of the rotation will duplicate the motor speeds just mentioned, but as the rotation reaches 180°, the back gear shift is made coupling the motor shaft direct to the spindle shaft, and the spindle speeds are accordingly stepped up to motor speeds as indicated. Accordingly, the movable contacts wherever necessary are duplicated as will be observed by inspection of the spread out view of the controller cylinder.

In order to lessen clashing of the gears as the controller lever is moved to shift spindle speed from 300 R. P. M. to 450 R. P. M. (position 4 to 5) through the gear shift, the movable contacts 130, 131, 132, 140, 141, 142, 143, 144, 145 and 146 are elongated so that they engage the contacts 91, 92, 93, 100, 101, 102, 112, 113, 114 and 115 at the time the mechanical gear shift is being initiated so that as the shiftable back gear reaches the point of mesh with the driven gear of the motor, the motor speed has been lowered to 450 R. P. M. lowest motor speed which is only slightly higher than the 300 spindle speed existing at the time of the shift.

It will be apparent that any one of a number of electrical devices may be used for lowering the motor speed, for instance, a reverse plugging contact to practically stop the motor or in the case of a D. C. motor, contacts causing dynamic braking.

Having described our invention, we claim:

1. In a shifting device including a controller shaft to be rotated and a gear carrying yoke to be slidably moved, a lever pivotally mounted, said lever having one end operatively engaging the gear carrying yoke and having its other end bifurcated, a disc mounted on the shaft, said disc carrying a crank pin element adapted to enter said bifurcated end of the lever for shifting the lever, a second disc mounted on the shaft, a locking arm as a part of the lever having arcuate surfaces engageable with the periphery of the last-named disc, said last-named disc including a flattened portion on the same side of the shaft as the crank pin adapted to clear the contact of the last-named disc and the locking arm when the lever is being shifted.

2. In a shifting device including a controller shaft and a shifting lever, a disc mounted on the shaft, said disc including means engageable with one end of the lever at one portion of the rotation of the disc for swinging the lever, a detent device coactive with the periphery of the disc for locating predetermined control positions of the controller shaft, and locking means for locking the lever against swing when said means on the disc is not engaging the lever.

3. In a shifting device including a controller shaft and a shifting lever, a disc mounted on the shaft, said disc including means engageable with one end of the lever at one portion of the rotation of the disc for swinging the lever, a detent device coactive with the periphery of the disc for locating predetermined control positions of the controller shaft, and a locking device for maintaining the lever in positions at its limits of movement, said device including elements on the lever and disc having curved surfaces rotatably nested throughout most of the movement of the disc, said curved surfaces discontinued adjacent to the means on the disc engageable with the lever for permitting swinging of the lever.

4. A shifting device, comprising, a shaft, means for rotating the shaft, a shifting lever pivotally mounted, a disc having a crank pin thereon engaging a bifurcated end of the lever for shifting the lever, detent means cooperating with the disc for holding it at any one of a series of predetermined positions, interlocking elements on the lever and disc nesting during rotation of the disc relative to the lever for preventing swinging movement of the lever, said elements shaped to discontinue nesting as the crank pin engages the lever.

5. A shifting device, comprising, a shaft, means for rotating the shaft, a shifting lever pivotally mounted, a disc having a crank pin thereon engaging a bifurcated end of the lever for shifting the lever, and detent means cooperating with the disc for holding it at any one of a series of predetermined positions.

CARL E. LINDEN.
RAYMOND H. McCLELLAN.